(12) United States Patent
Lee

(10) Patent No.: US 8,776,648 B2
(45) Date of Patent: Jul. 15, 2014

(54) ERGONOMIC TOOL HANDLE ENHANCEMENT

(76) Inventor: Sung K. Lee, Glenview, IL (US)

( * ) Notice: Subject to any disclaimer, the term of this patent is extended or adjusted under 35 U.S.C. 154(b) by 278 days.

(21) Appl. No.: 13/326,224

(22) Filed: Dec. 14, 2011

(65) Prior Publication Data

US 2012/0144964 A1 Jun. 14, 2012

Related U.S. Application Data

(60) Provisional application No. 61/422,811, filed on Dec. 14, 2010, provisional application No. 61/524,314, filed on Aug. 16, 2011.

(51) Int. Cl.
*B25G 1/10* (2006.01)
*A46B 5/02* (2006.01)
*A01B 1/00* (2006.01)
*A47L 13/08* (2006.01)
*A01B 1/22* (2006.01)

(52) U.S. Cl.
CPC . *B25G 1/102* (2013.01); *A01B 1/00* (2013.01); *A01B 1/22* (2013.01); *A47L 13/08* (2013.01); *Y10S 16/901* (2013.01)
USPC .................................. 81/489; 16/426; 16/901

(58) Field of Classification Search
USPC ........ 81/489, 177.1, 177.8; 16/422, 426, 430, 16/900
See application file for complete search history.

(56) References Cited

U.S. PATENT DOCUMENTS

| | | | | |
|---|---|---|---|---|
| 2,516,852 A | * | 8/1950 | Burry et al. | 135/71 |
| 3,269,399 A | * | 8/1966 | Smith | 135/72 |
| 5,455,981 A | * | 10/1995 | Wiese | 15/236.01 |
| 5,471,698 A | * | 12/1995 | Francis et al. | 15/144.1 |
| 5,471,700 A | * | 12/1995 | Pereira | 15/160 |
| 5,474,350 A | * | 12/1995 | Gauthier | 294/58 |
| 6,199,245 B1 | * | 3/2001 | Blessing | 16/430 |
| 6,598,266 B1 | * | 7/2003 | Elliott | 16/430 |
| 8,016,118 B2 | * | 9/2011 | Boll | 209/417 |
| 8,464,399 B2 | * | 6/2013 | Herigstad | 16/430 |
| 2009/0114257 A1 | * | 5/2009 | Sutton | 135/72 |
| 2011/0099765 A1 | * | 5/2011 | Youssefieh | 16/430 |

* cited by examiner

*Primary Examiner* — David B Thomas
(74) *Attorney, Agent, or Firm* — Bishop Diehl & Lee, Ltd.

(57) ABSTRACT

A tool handle including: a body configured to receive a handle of a tool; a hand grip extending approximately perpendicular from the body; and an arm ring rotatably disposed on the body, wherein the arm ring is adapted to be placed in at least two positions, a first position in which the arm ring is generally perpendicular to the hand grip such that a user may place the user's forearm through the arm ring to grasp the hand grip and a second position in which the arm ring is generally parallel to the hand grip so as to minimize the width of the tool handle.

17 Claims, 13 Drawing Sheets

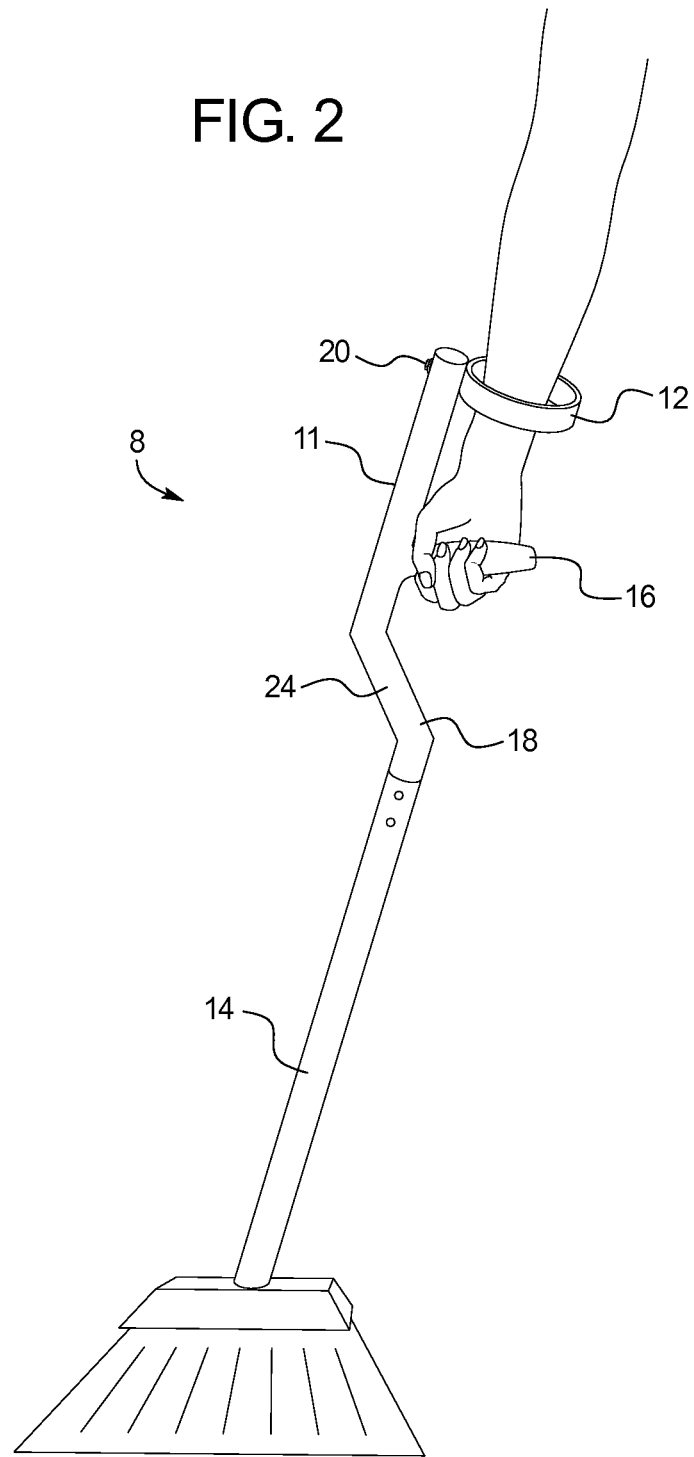

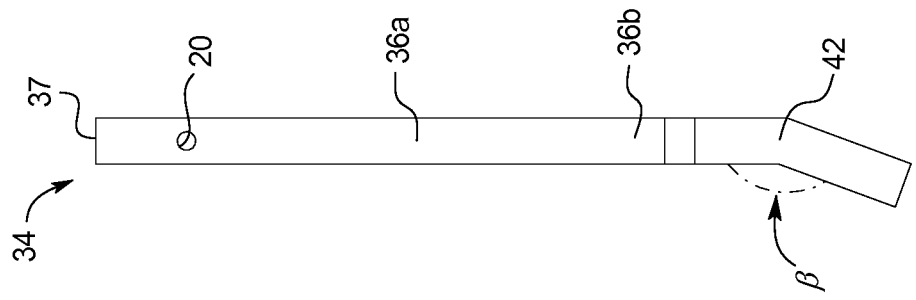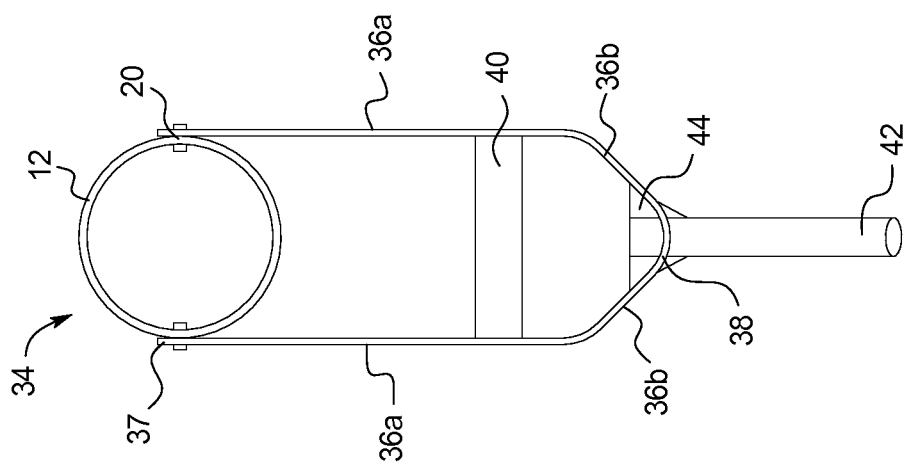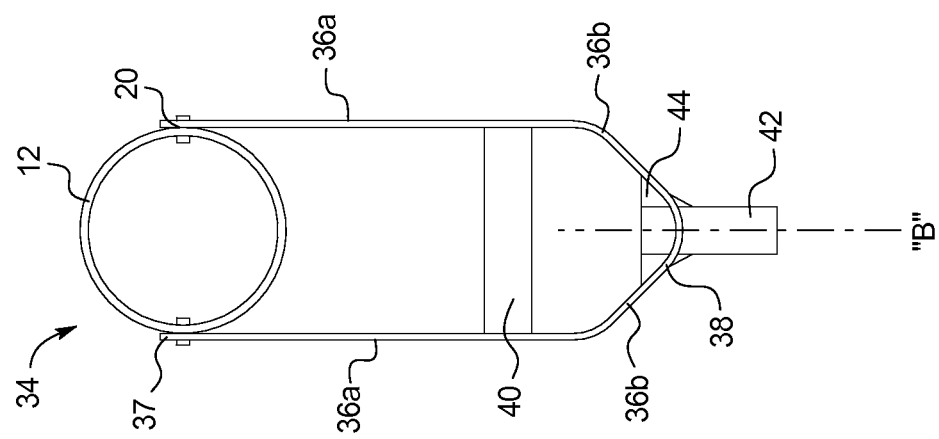

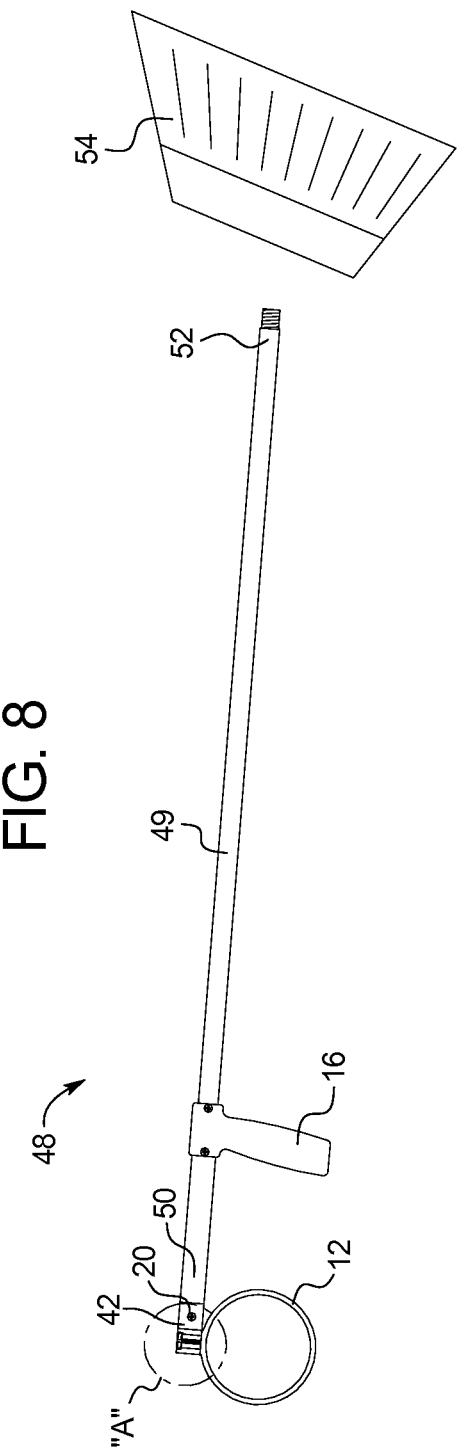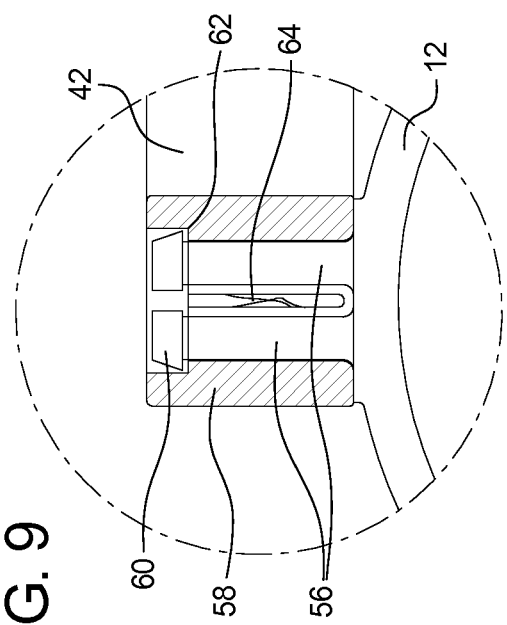

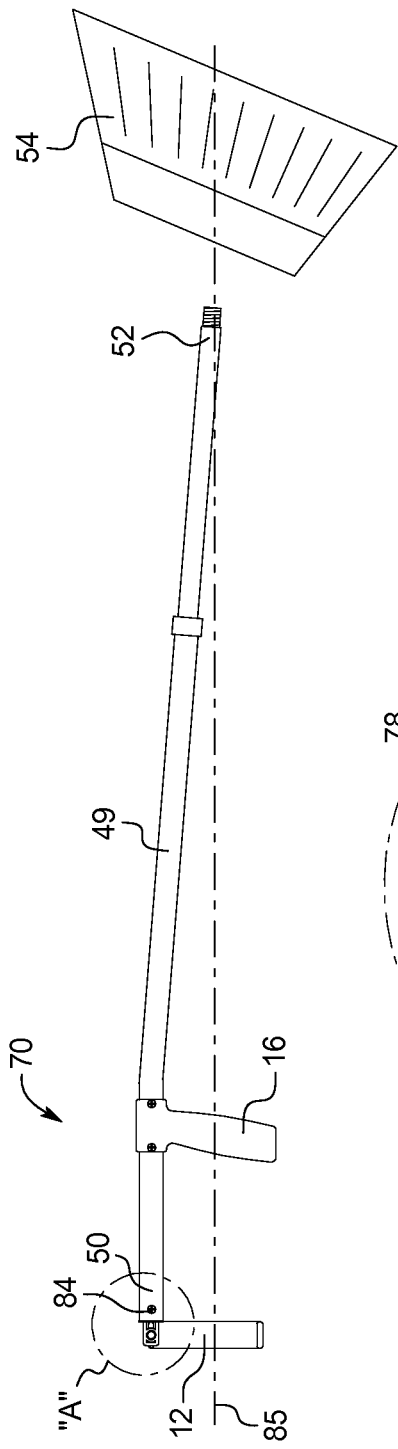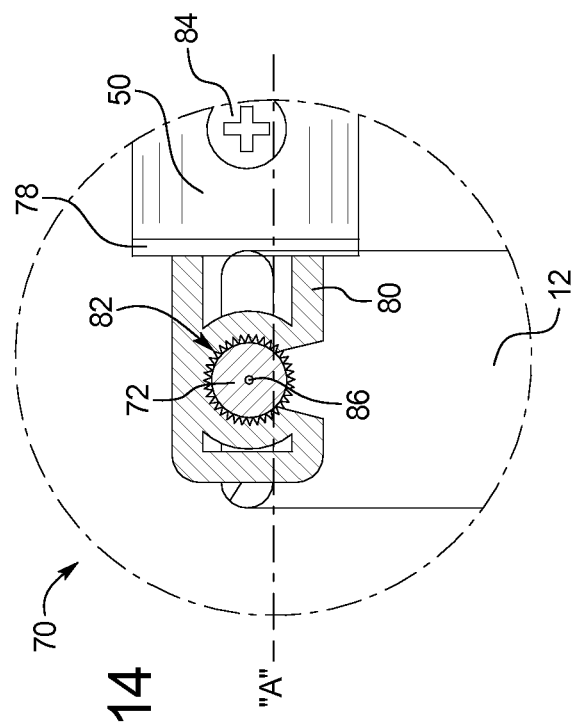

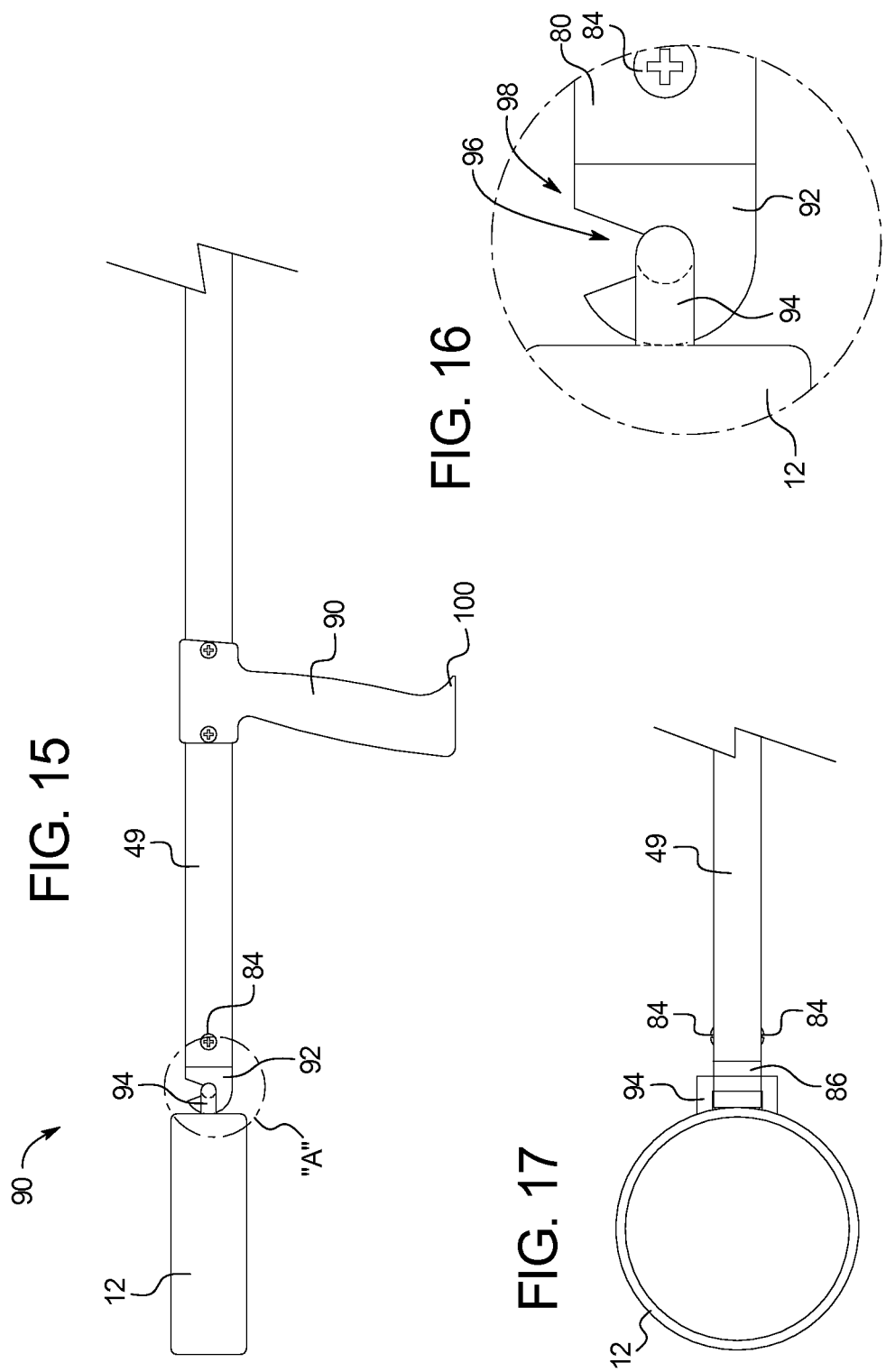

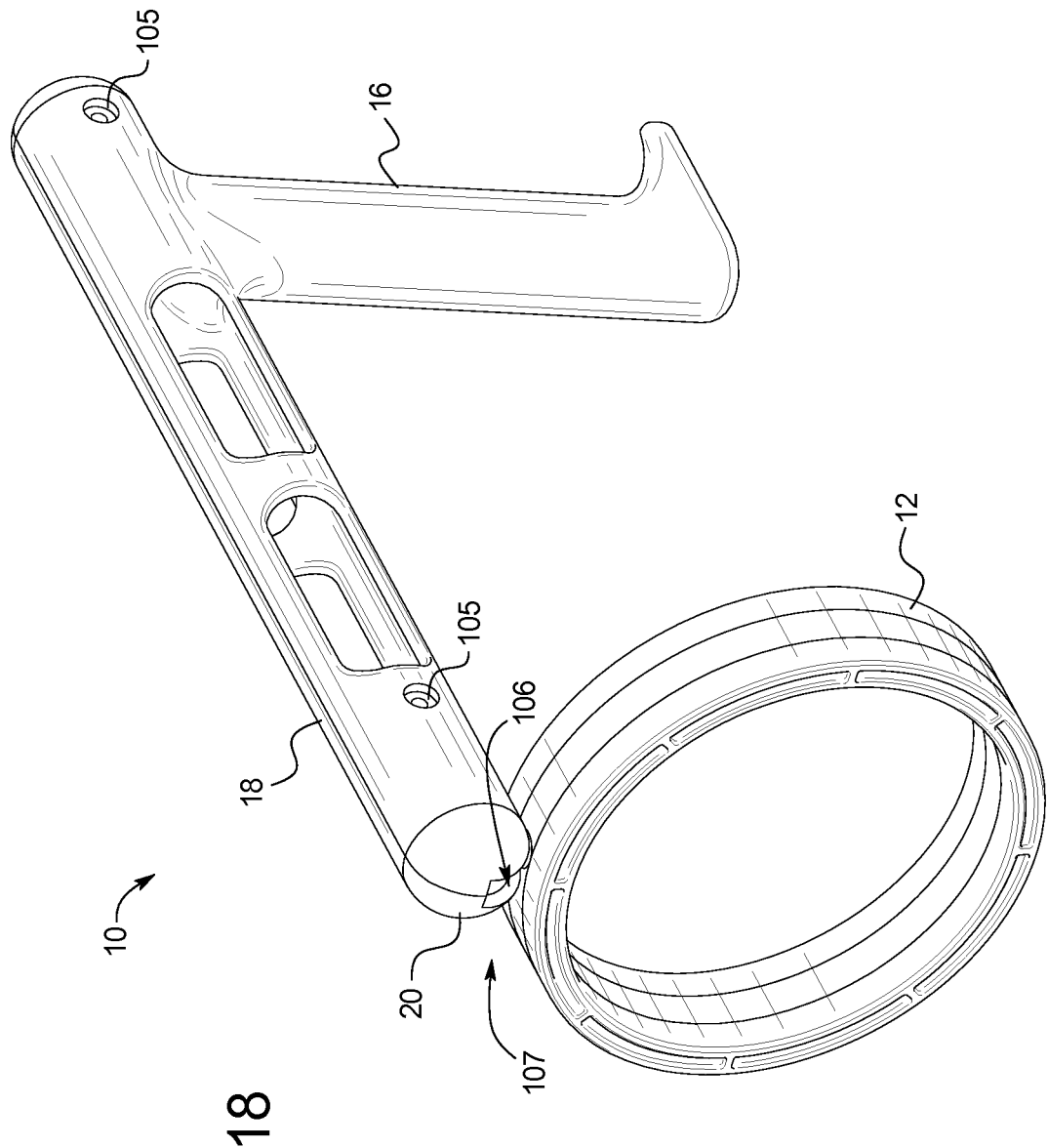

ERGONOMIC TOOL HANDLE ENHANCEMENT

CROSS-REFERENCE TO RELATED APPLICATIONS

This application incorporates by reference and claims priority to U.S. Provisional Patent Application No. 61/422,811, filed Dec. 14, 2010 and U.S. Provisional Patent Application No. 61/524,314, filed on Aug. 16, 2011.

BACKGROUND OF THE INVENTION

The present invention relates generally to a tool handle enhancement for various tools including brooms, shovels, rakes and power tools. More specifically, an ergonomic tool handle is provided to ease strain on the operator's wrist, elbow and/or back.

Conventional brooms, rakes or similar tools, especially those having elongated, pole type handles are operated by maneuvering the tool using the wrists, arms, shoulders and back. For example, a broom operator does this type of work to sweep debris into a pile. Areas which are difficult to access, such as under a table or corners, may involve additional use of the legs, back and other muscles to provide leverage and support. Power tools, such as circular saws, are typically heavy, and may require an operator to apply additional strength to achieve the desired precision and control when maneuvering the tool.

U.S. Pat. No. 4,888,846 to Natale discloses a generally Y-shaped handle for an asbestos scraping tool featuring an extension bracket having a ring with an opening for cradling the arm. Crossbars extend backward from the scraping tool and are attached to the ring at opposite free ends. A handle bar is connected to the crossbars near the scraping tool end. The operator places his arm through the ring and grips the handle bar. Operators of conventional scraping tools make repeated short strokes using hand-applied pressure to scrape asbestos material from walls. Natale's tool handle enables the operator to use less effort, yet apply greater force to the scraper blade compared to conventional scraping tools.

U.S. Pat. No. 5,890,259 to Sarac discloses an extension handle similar to Natale's, but having a pivoting ring bracket and a tool receiver end for various attachments. The pivotal connection of the ring bracket to the crossbars improves the operator's comfort. In addition to a hand grip bar spanning the crossbars, the tool receiver end is configured for use as a second hand grip.

U.S. Pat. No. 2,197,279 to Thorssen discloses an arm receiving loop that replaces a top, padded bar on a crutch. The loop is permanently attached to two divergent ends of the crutch with an interiorly threaded bushing into which a bolt, especially a carriage bolt, is threaded. Thorssen's arm loop pivots and rotates easily and freely because the outer surface of the bushing is smooth. A user can turn the loop to an upright position and utilize the arm loop to hang the crutch on a hook or in a closet if desired. The arm receiving loop disclosed by Thorssen is designed to encircle the user's arm somewhat above the elbow, and its main function is to prevent the crutch from sliding or slipping outwardly away from the user's body. It is also disclosed that the arm loop is utilized in conjunction with a handle that supports the user's weight and allows for proper control of the crutch.

U.S. Pat. No. 6,557,264 to Maeda discloses a metal wire ring attachment for a cooking utensil. The ring may be folded or rotated freely to adjust the angle between the utensil handle and plane of the ring. Maeda's wire ring provides support for the utensil when rested on a solid surface.

A disadvantage of the prior art is that the operator does not receive adequate relief from arm fatigue or assistance with maintaining adequate control over the tool from the various ring or loop attachments. Accordingly, a need exists for a ergonomic tool handle enhancement having a rotatable arm ring that may be rearranged and configured into different positions while providing resistance to rotation as described and claimed herein.

BRIEF SUMMARY OF THE INVENTION

The above-identified drawbacks are solved by providing an ergonomic tool handle having an arm ring that is rotatable, but with built in resistance to rotation. With the present arm ring being rotatable by application of rotational force (torque), and temporarily fixable in various positions, the operator has an improved amount of control over the tool, ease of operation and more storage options.

In one embodiment, the present invention provides an ergonomic tool handle including a tool handle member having a first crossbar, where the crossbar has a free end and an opposite working end. Also included is an arm ring rotatably disposed on the free end of the crossbar at a point of attachment. The arm ring is rotatable with a resistance about the point of attachment and temporarily fixable in selected positions. A hand grip is secured to and extends generally transversely from the crossbar.

Another embodiment of the present ergonomic tool handle includes a shaft having a proximate end and an opposite distal end, which is associated with a tool implement. An arm ring is rotatably engaged with the proximate end of the shaft and the present ring rotates with a resistance to free rotation, as previously described. Also included is a hand grip that extends generally transversely from the present ergonomic tool handle shaft at less than a cubit from the present arm ring located at the proximate end.

In another additional embodiment of the ergonomic tool handle, the tool handle is a clamshell formation in which the tool handle member is integrally formed with the point of attachment at the free end. The hollow center tool handle surrounds the tool using the shaft of the tool as structural support adding rigidity to the tool handle. The arm ring is pivotally secured within the point of attachment at the free end of the tool handle.

The tool handle may be used with a long list of different tools. This list is not limited to but may include a broom, dustpan, mop, rake, shovel, and plunger. The tool handle may also be used with electrical tools such as a vacuum, reciprocating saw, hammer drill, or worm gear saw. The tool handle is not only compatible with tools, but may also be attached to sports equipment such as a golf club or putter, tennis racket, or pool cue.

In one example, a tool handle includes: a body configured to receive a handle of a tool; a hand grip extending approximately perpendicular from the body; and an arm ring rotatably disposed on the body, wherein the arm ring is adapted to be placed in at least two positions, a first position in which the arm ring is generally perpendicular to the hand grip such that a user may place the user's forearm through the arm ring to grasp the hand grip and a second position in which the arm ring is generally parallel to the hand grip so as to minimize the width of the tool handle. The arm ring may be rotatable with a resistance between the first position and second position and temporarily fixable in at least selected positions. The rotational resistance may be sufficient for supporting independent standing of the tool handle when inverted and placed on a substrate, with the arm ring contacting the substrate.

Further, the hand grip may be located less than a cubit from the arm ring, the body may be a two-piece clamshell formation, the body may be overmolded on the handle of the tool, the arm ring may be rotatably connected to the body via a ball joint, the ball joint may be formed within a socket at a free end of the body, the socket may include a slot guiding the movement of the arm ring within the socket. In some embodiments, the inner diameter of the arm ring is approximately 3 to 5 inches and the distance from the arm ring to the hand grip is approximately 6 to 10 inches.

In another example, a tool handle includes: a tool handle member having a first crossbar with a free end and an opposite working end; and an arm ring rotatably disposed on the free end of the crossbar at a point of attachment, being rotatable with a resistance about the point of attachment and being temporarily fixable in selected positions; and a hand grip secured to and extending generally transversely from the crossbar. The rotational resistance may be sufficient for supporting independent standing of the tool handle when inverted and placed on a substrate, with the arm ring contacting the substrate. The point of attachment may be a ball joint, including a ball end located on the arm ring and a socket on the crossbar. The rotational resistance is formed primarily by the outer diameter of the ball end being slightly larger than the inner diameter of the socket. The stress placed on the socket by the ball end may not exceed the elastic limits of the material forming the socket.

In still another example, a tool handle includes: a shaft having a proximate end and an opposite distal end, wherein at least the distal end attaches to a tool implement; an arm ring disposed at the proximate end of the shaft rotatably engaged with the shaft, wherein the arm ring rotates with a resistance to free rotation; and a hand grip extending generally transversely from the shaft at less than a cubit from the arm ring and the proximate end of the shaft. The arm ring may be rotatably engaged to the tool handle with a threaded fastener system configured for providing resistance. Alternatively, the arm ring may be rotatably engaged to the tool handle via a ball joint, wherein the shaft includes a socket and the arm ring includes a ball end. The shaft may be a two-part clamshell formation. The rotational resistance of the arm ring may allow independent standing of an inverted tool, wherein the arm ring contacts a substrate.

An advantage of the ergonomic tool handle is that it eases pain on a user's arm, wrist, neck and back.

Another advantage of the ergonomic tool handle sign is that it is adaptable to various tools.

A further advantage of the ergonomic tool handle is that it may be configured into different positions.

Yet another advantage of the ergonomic tool handle is that it may be positioned in a way so that is may stand a tool upright.

Another advantage of the ergonomic tool handle is that it may be positioned so that it is stackable.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIG. 2 is a front elevational view of an embodiment of the tool handle, configured as a broomstick, being held by an operator;

FIG. 5 is a front elevational view of a double crossbar ergonomic tool handle member with an arm ring in the axially aligned position;

FIG. 6 is a front elevational view of an alternate embodiment of the tool handle member of FIG. 5 where the tool receiver end is angled;

FIG. 7 is a side elevational view of the tool handle member of FIG. 6;

FIG. 8 is a front elevation of a broom handle with the present arm ring and a hand grip attached;

FIG. 9 is a fragmentally enlarged vertical cross-section view of "A" of FIG. 8;

FIG. 13 is a front elevation of the present ergonomic tool handle configured as broom handle;

FIG. 14 is an enlarged view of the area "A" in FIG. 13;

FIG. 15 is a partial front elevation of the present ergonomic tool handle configured with an arm ring that rotates around an axis that is displaced from and along the tool handle axis;

FIG. 16 is an enlarged view of the area "A" of FIG. 15; and

FIG. 17 is a top view of the arm ring of FIG. 15.

FIG. 18 is a perspective view of an alternative embodiment of the tool handle member.

DETAILED DESCRIPTION OF THE INVENTION

Figure 1:
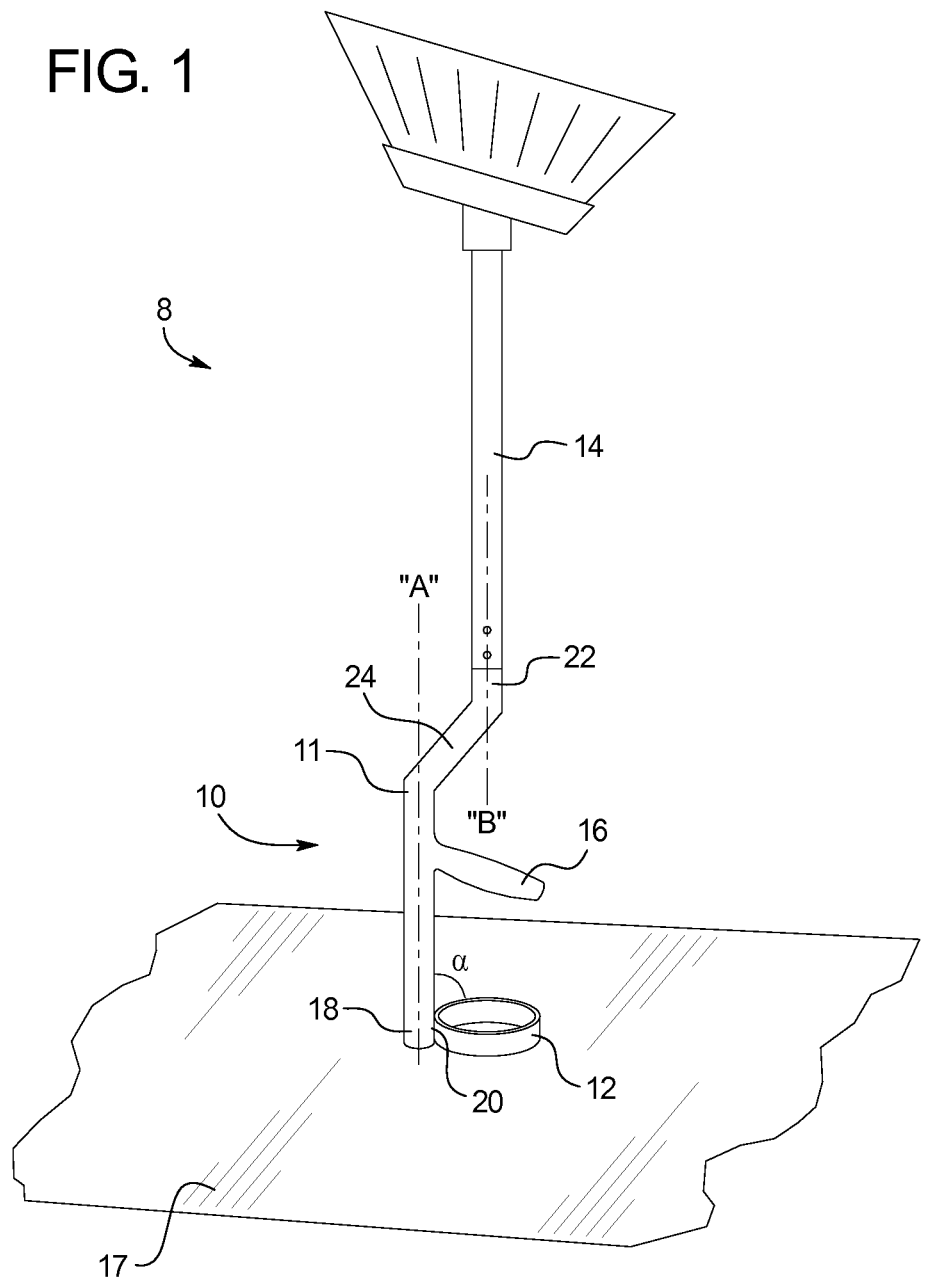
FIG. 1 is a front elevational view of an inverted tool with an arm ring of a single crossbar ergonomic tool handle member disposed for use as a stand.

Referring to FIG. 1, a tool generally designated 8 is depicted as a broom, however other tools are contemplated, including but not limited to snow shovels, rakes, saws, hammers, lawn and hedge trimmers, scrapers and other powered or non-powered hand operated tools. An ergonomic tool handle, generally shown at 10, includes a single crossbar 11, and an arm ring 12 that is rotatably attached to the crossbar. A pole or shaft type tool handle member 14, such as that of a broom or rake, is connected to the ergonomic tool handle 10, which also preferably has a hand grip 16 that extends generally transversely from the crossbar 11. The tool 8 is shown inverted from its conventional use position and is supported on a substrate 17. The crossbar 11 includes a free end 18, where the arm ring 12 is rotatably disposed at a point of attachment 20 (best seen in FIG. 3), and an opposite working end 22 that is associated with the tool handle member 14.

In a preferred embodiment, the hand grip 16 is secured to the crossbar 11 of the ergonomic tool handle 10 by being integrally molded thereto; however, fastening using threaded fasteners, rivets, adhesive or the like is also contemplated. The hand grip 16 extends generally transversely from the crossbar 11 to provide the operator with improved comfort and control of the tool 8 when in use, and improved storage options when the tool 8 is not in use. For example, the hand grip 16 is optionally placed on a shelf or a ledge and the tool 8 is supported with ease and convenience. The hand grip is optionally provided with a hooked end (FIG. 15) to enhance stability of the tool 8 when stored by placing the hand grip 16 on a ledge or shelf of any kind.

In FIG. 1, the arm ring 12 of the single crossbar 11 is disposed for use as a stand. The free end 18 of the ergonomic tool handle 10 defines an axis "A" that is displaced from an axis "B", defined by the working end 22, by an angled portion 24 of the crossbar 11. A gusset 25 (FIG. 3) is optionally included between the working end 22 and the angled portion 24 of the crossbar 11 to provide strength and durability to the ergonomic tool handle 10. As is described in more detail below, the arm ring 12 is rotatable about the point of attachment 20 with a resistance. Thus, the ring 12 is temporarily fixable in selected positions, which allows an operator to be more comfortable and to have more storage options for the tool 8. An angle α is 90° or less between the axis "A" and a plane defined by the arm ring 12 when positioned as a stand. Preferably, the angle α measuring 90° or less allows a center of mass of the tool 8 to align with the arm ring 12, thereby providing increased stability when the tool 8 is inverted as well as improved comfort and control for the operator when the tool 8 is in use (FIG. 2).

Figure 3:
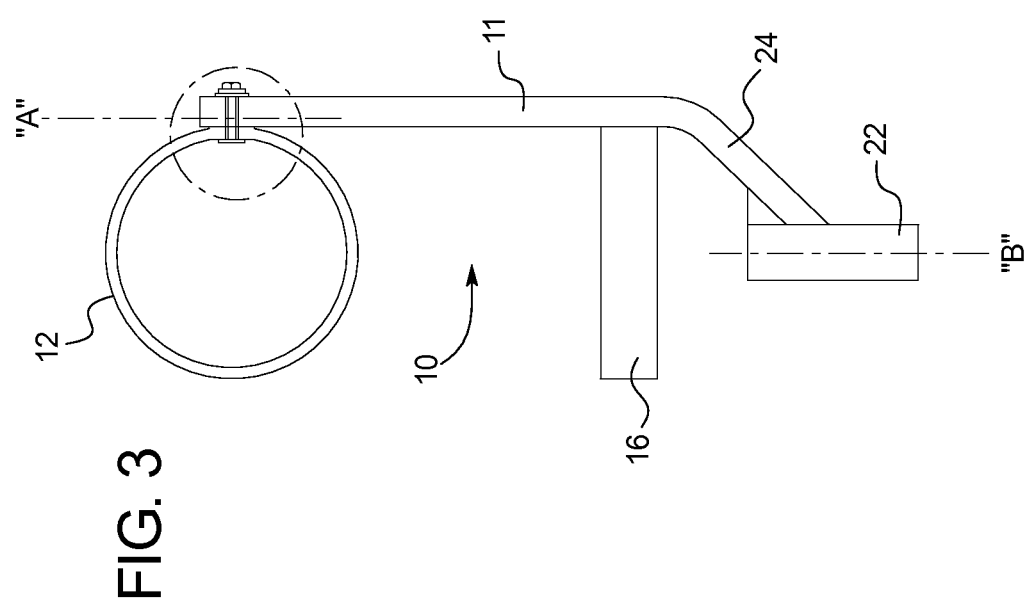
FIG. 3 is a front elevational view of a single crossbar tool handle member with an arm ring in the axially aligned position.

FIG. 3 depicts the arm ring 12 in a position where a plane defined by the ring is aligned with the axis "A" for facilitating suspending the tool 8 from a hook, a door, a shelf, or the like. Rotational resistance of the arm ring 12 is intentionally provided during the manufacturing or assembly of the present ergonomic tool handle 10. Preferably, this resistance is provided by fasteners at the point of attachment 20. Fasteners may optionally include a chemical thread sealer on a portion of a threaded fastener, a rotatable spline joint, a locking washer, matingly engaged threaded fasteners, geometrically differentiated fasteners, spherical ball joint fasteners, or other mechanical systems known in the art.

Torque is applied to overcome the built in rotational resistance and cause rotation of the present arm ring 12. As a consequence of the built in rotational resistance, the present arm ring 12 will hold its position when an operator stops applying the torque. Thus, the ring 12 is capable of supporting the weight of the respective tool 8 when inverted, allowing the present arm ring to be used as a stand (FIG. 1), as previously described. Another consequence of the rotational resistance is that side-to-side forces on the inner surface of the present arm ring 12, resulting from contact with the operator's forearm during movement (FIG. 2), are utilized to improve operator control over the various tools 8 equipped with the present ergonomic tool handle 10. These forces are not usually sufficient to rotate the arm ring 12, thus the operator experiences improved control and comfort. Stress on the operator's wrist, back and shoulder is relieved, while stronger parts of the operator's body, such as the bicep, are advantageously engaged to more ergonomically maneuver the tool 8.

Figure 4:
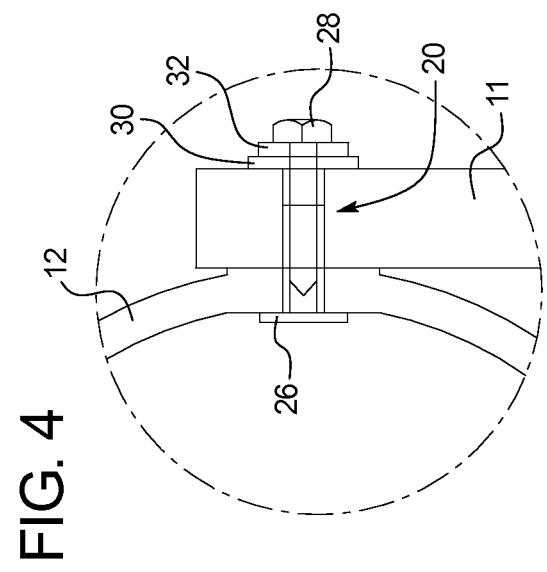
FIG. 4 is a fragmentally enlarged view of "A" in FIG. 3.

Turning now to FIG. 4, an enlarged view of area "A" of FIG. 3 is shown. An embodiment of the point of attachment 20 of the present arm ring 12 to the crossbar 11 is shown, where the rotational resistance is provided by matingly engaging a first threaded fastener 26 with a second threaded fastener 28 with sufficient tightness to exert a compressive force between the ring 12 and the crossbar 11. Fasteners are held in place by a flat washer 30 and a locking washer 32. Optionally, a thread sealer which chemically binds threaded fasteners is applied to at least one portion of the threaded fastener 28 by dipping it into the thread sealer at the time of assembly. LOCTITE® thread locking fluid, PERMATEX® adhesive and sealant, JET LUBE®, threadlocker and DEVCON® adhesive are all suitable thread locking or sealing products widely available and well known in the art. Any liquid or solid material that locks the threads of a screw or bolt will retain the compressive engagement for constant resistance to rotation of the present arm ring 12.

The following are some known fastening techniques that may be employed to achieve resistance to rotating or pivoting of the arm ring 12 relative to the crossbar or tool handle: nails, wood screw, wood screw with regular or lock washer, nut and bolt, nut and bolt with regular or lock washer, matingly engaging threaded fasteners, threaded fasteners with regular or locking washers, knurled or splined joints, geometrically different shaped fastening systems, a spherical fitted joint, or other mechanisms known in the art.

Another embodiment is contemplated where resistance to rotation of the arm ring 12 is provided by a detent. The detent may include a protrusion and a dimple. Torque is required to rotate the present arm ring 12 out of position where a protrusion and dimple are coordinated, temporarily locking the arm ring in place.

Referring again to FIGS. 1 and 2, in the preferred embodiment, the arm ring 12 is approximately 0.2 to 2.5 inches (0.5 to 6.4 cm) tall, measured along its axis, and has an inner diameter of approximately 3 to 5 inches (7.5 to 13 cm). The present arm ring 12 is designed to be rotated about the point of attachment 20 to a transverse position relative to the crossbar 11 and positioned somewhere in the middle of the operator's forearm when holding the hand grip 16, and to provide a clearance around the forearm, but also to contact the operator's forearm during a side to side movement (FIG. 2). This contact usually does not provide enough torque to rotate the arm ring 12, thus the arm ring 12 assists the operator in moving and controlling the tool 8. The distance between the point of attachment 20 of the present arm ring 12 and the hand grip 16 is approximately 6 to 10 inches (15-25 cm). Preferred dimensions, as described above, of the ergonomic tool handle 10 have been determined to improve the operator's comfort by decreasing strain on the operator's wrist when maneuvering the tool. Other dimensions are contemplated depending on the shape, weight and application of the tool 8.

In FIGS. 5, 6 and 7, an alternative double crossbar embodiment of the ergonomic tool handle is shown and generally designated 34. Components shared with the ergonomic tool handle 10 are identified with identical reference numbers. Referring to FIG. 5, the present ergonomic tool handle 34 includes first and second generally parallel crossbars 36*a*, with tapered ends 36*b* and free ends 37 that are divergent from a working end 38. A hand grip 40 spans between, and is attached at each end to one of the generally parallel crossbars 36*a*, as by welding, chemical adhesives, threaded fasteners, or other attachment systems previously described. The crossbars 36*a* are in spaced, parallel relation to each other and extend from the arm ring 12 to the opposite side of the hand grip 40. In a preferred embodiment, the tapered ends of the crossbars 36*b* are engaged by a tool receiver 42 that is angled at an angle β (FIG. 7) defined between the arm ring 12 and an axis of the tool handle 34, as shown in FIG. 7. In this embodiment, the tool receiver 42 ultimately connects the arm ring 12 to the tool handle member 14.

The angled tool receiver 42 is optionally applied to the previously described tool handle 10 (FIG. 1) to provide the desired angle α between the arm ring 12 and the tool handle. As previously described, the angles α, β provide improved comfort to the operator as well as improved stability to the tool 8 when inverted and stood on the substrate 17 utilizing the arm ring 12 as a stand. An optional gusset 44 supports the connection of the tool receiver 42 to the crossbars 36*b*.

Referring now to FIG. 8, a crossbar-free embodiment of an ergonomic tool handle is generally designated 48, wherein components shared with ergonomic tool handles 10 and 34 are identified with identical reference numbers. The ergonomic tool handle 48 includes a shaft 49 with a proximate end 50 and an opposite distal end 52, which is associated with a tool implement 54. As is known in the art, the shaft 49 is either solid or hollow. Although the tool implement 54 is configured as the head of a broom; a wide variety of tool implements are considered compatible with the present ergonomic tool handles 10, 34, 48, including rakes, dust pans, and the like. A feature of the tool handle 48 is that the arm ring 12 and the hand grip 16 are separately and directly attached to the tool handle shaft 49. As shown, the ergonomic tool handle shaft 49 is configured as a broom stick, though other tool handle configurations are contemplated, as previously described. Also previously described, the present arm ring 12 rotates with a resistance to free rotation that is provided by methods known in the art and also previously discussed.

Additionally, the hand grip 16 extends generally transversely from the ergonomic tool handle shaft 49. A distance of less than one cubit separates the present arm ring 12 from the present hand grip 16. A cubit is a unit of length approximately equal to the distance between a person's elbow and palm. Preferably, the hand grip 16 will be approximately 6 to 10 inches (15-25 cm) from the arm ring 12 at the proximate end 50 of the tool handle 66.

A preferred engagement of the hand grip 16 to the ergonomic tool handle 48 is provided by a clamshell formation (not shown). As is known in the art, the clamshell formation provides a hand grip 16 that is manufactured from a plastic material, by known methods, and is assembled in place on the broom stick, or other ergonomic tool handle 48, by fastening two halves together in place.

Alternatively, the hand grip 16 is engaged with the ergonomic tool handle 48 by a second tool receiver (not shown). Any tool receiver 42 is mountable by a variety of connection technologies, including, but not limited to, telescoping friction fit, spring loaded latches, detents, threaded fasteners, extension clasps and the like. As previously described and as shown in FIG. 8, the present arm ring 12 extends generally transversely from the first tool receiver 42. As discussed above, in relation to the ergonomic tool handle 10 and in the tool handle 48, the arm ring 12 is mounted to be able to balance the shaft 49 when inverted and placed on the substrate 17. In this embodiment, the tool receiver 42 is slightly angled, as seen in FIG. 7, thereby providing attachment of the arm ring 12 at the angle α (FIG. 1) less than 90° between a plane defined by the tool handle shaft 49 and the arm ring when the arm ring is disposed as a stand, resting on the substrate 17 to support the weight of the tool.

As shown, the ergonomic tool handle 48 rotatably engages the present arm ring 12 by the tool receiver 42 disposed on the proximate end 50 of the shaft 49. The tool receiver accommodates the arm ring 12 by mechanical fastening means known in the art, including tension fitting, threaded fasteners and others.

Figure 10:
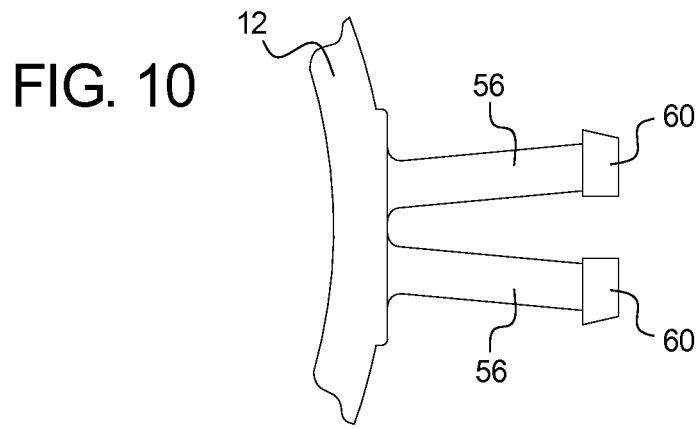
FIG. 10 is an enlarged elevational view of a pair of biased prongs which are part of an embodiment of the present arm ring before they are pressed into the bore of a receiver to attach the arm ring to the tool handle.

Referring now to FIGS. 8-10, a preferred connection of the arm ring 12 to the crossbar free ergonomic tool handle 48, or to the single or double crossbar ergonomic tool handle embodiments 10, 34 as previously described, includes at least a pair of inherently laterally outward biased prongs 56 attached to the ring 12 and engaging a bore 58 in the tool receiver 42. If a crossbar is present, the tool receiver 42 is located in the crossbar 11, 38 (FIGS. 1 and 5) rather than in the shaft of the crossbar-free ergonomic tool handle 48 (FIG. 8). An area labeled "A" in FIG. 8 is enlarged and shown in FIG. 9. In this embodiment, the pair of inherently biased prongs 56 extend from the arm ring 12 and are pressed into, or engaged with, the bore 58 in the tool receiver 42. The prongs 56 are provided with barbed heads 60 which catch on a counterbored shoulder 62 and aid in retaining the prongs inside the tool receiver 42. As shown in FIG. 8, the tool receiver 42 is situated at the proximate end 50 of the crossbar-free ergonomic tool handle 48. Optionally, a spring 64 is located between the biased prongs 56 to provide more tension, thus more resistance to rotation.

Referring to FIG. 10, the pair of biased prongs 56 is shown in a biased or splayed position, prior to engagement with the tool receiver 42. While the prongs 56 are also shown here as protruding or extending from the arm ring 12, it is also contemplated that the prongs are optionally extendable from the tool receiver 42 with the arm ring 12 providing the bore 58 into which the prongs 56 are engaged.

Figure 11:
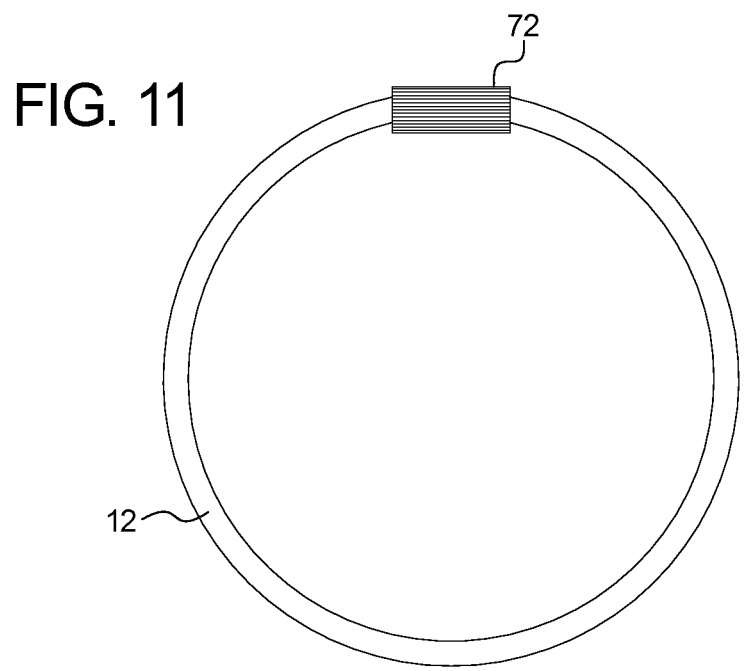
FIG. 11 is a front elevation of the present arm ring provided with a splined collar.
Figure 12:
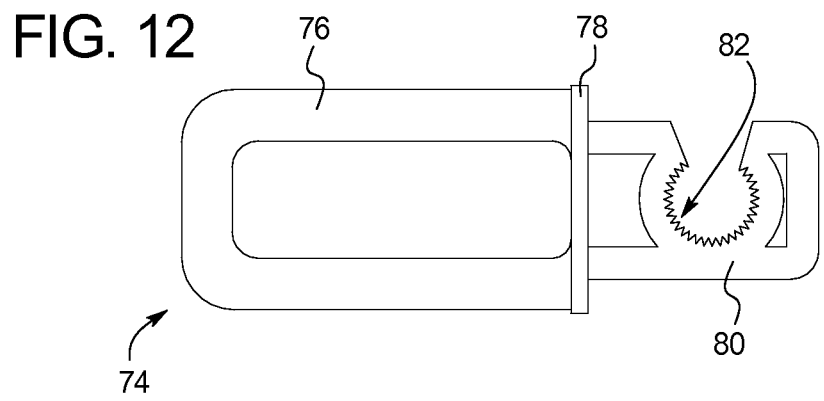
FIG. 12 is an enlarged side elevation of a splined tool receiver formation.

Referring now to FIGS. 11-14, another embodiment of an ergonomic tool handle is shown and generally designated 70. Components shared with the ergonomic tool handles 10, 34 and 48 are designated with identical reference numbers. In this embodiment 70, the shaft 49 is provided with a bend in order to achieve alignment of the arm ring 12 with the center of mass of the tool 8, as previously described in relation to the embodiment 10. In FIG. 11, the present arm ring 12 is provided with a splined collar 72. In FIG. 12, an open splined tool receiver formation is generally designated 74. A shaft engaging lug 76 is preferably a molded plastic formation and is configured for axial insertion and tight frictional engagement in the proximate end 50 of the shaft 49 of the ergonomic tool handle 70 (FIG. 13). A radial lip 78 is provided on the tool receiver formation 74 that engages and end of the hollow shaft 49. An open splined portion 80 of the splined tool receiver 74 is constructed and arranged to extend from the lip 78. Because the splined portion 80 defines a generally open "U" shape, splines 82 on the receiver formation 74 do not engage all splines on the splined collar 72. Therefore, rotation of the arm ring 12 is possible when an operator applies torque to obtain a change in ring position.

Referring now to FIGS. 13 and 14, the present ergonomic tool handle shaft 49 is configured as a broom handle, and the area marked "A" in FIG. 13 is enlarged in FIG. 14 to show the assembly of the spline joint attachment system of FIGS. 11-14. Components shared with the ergonomic tool handles 10, 34 and 48 are designated with identical reference numbers. The arm ring 12 rotates about an axis defined by the collar 72, which is engaged with the splined portion 80. Preferably, the tool receiver 74 is further held in place on the ergonomic tool handle shaft 49 with a threaded fastener 84.

The embodiment 70, shown in FIG. 13, preferably features an axial flip rotation of the present arm ring 12 around an axis 86 that is displaced beyond the proximate end 50 of tool handle shaft 49, in addition to being transverse to the tool handle axis 85. This flip rotation of the present arm ring 12 facilitates utilization of the ring as a means for hanging the tool handle 70 on a hook or other support.

Also shown in FIGS. 15-17 is an embodiment of the crossbar-free ergonomic tool handle 48, 70, generally designated 90. Components shared with the handles 10, 48, 70 are designated with identical reference numbers. A main feature of the handle 90 is a tool receiver 92 that receives a generally U-shaped bracket 94 of the arm ring 12. The bracket 94 is snap fit into a slot 96 in the receiver 92, which preferably includes a V-shaped guide 98 to facilitate tight frictional and rotational engagement and retention of the bracket. The bracket 94 is held by friction into the proximate end 50 of the tool handle shaft 49 and is secured in place by at least one threaded fastener 84. Rotational engagement of the bracket 94 and the tool receiver 92 allows the arm ring 12 to change positions. As previously described, rotation is resisted until torque is applied. Also shown in FIG. 15 is an alternate hand grip 90 that is provided with a general hook shape formation 100 to facilitate securely hanging the tool handle 90 from a ledge or other supportive structure.

An additional embodiment of the ergonomic tool handle 10 is shown in FIGS. 18-21. As shown, most similar to the embodiments described with respect to FIGS. 8 and 9, the tool handle 10 includes two halves 102 in a clamshell formation in which the hand grip 16 is integrally formed with the point of attachment 20 at the free end 18. As shown in FIG. 18, the hollow-center tool handle 10 is adapted to surround the tool 8 using the shaft 49 of the tool 8 as structural support adding rigidity to the tool handle 10. The arm ring 12 includes a ball end 104 that is pivotally secured within the socket 107 created at the point of attachment 20 at the free end 18 of the tool handle 10. Securing the ball end 104 in the socket 107 allows the arm ring 12 to be rotatable with respect to the tool handle 10, as described further herein.

Figure 19A:
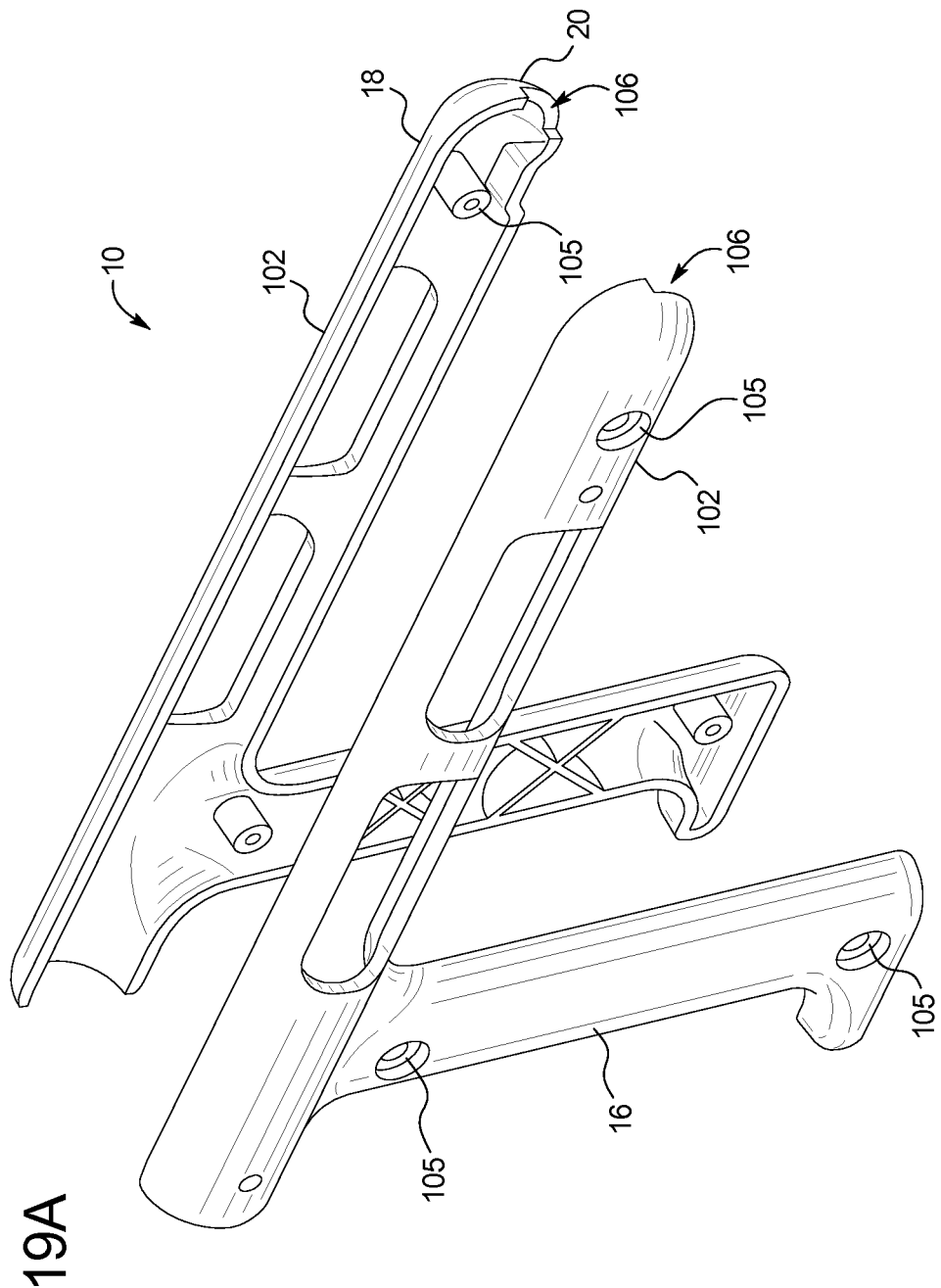
FIG. 19 is an exploded view of the alternative embodiment of the tool handle member of FIG. 18.

FIG. 19A is an exploded view of the example of the tool handle 10 shown in FIG. 18, demonstrating the two distinct halves 102 that form the structure of this embodiment of the tool handle 10. When assembled, the tool handle 10 surrounds the shaft 49 of the tool 8 and the ball end 104 of the arm ring 12 is rotatably secured within the socket 107 formed at the free end 18 at the point of attachment 20. In the example shown, the external diameter of the ball end 104 is slightly larger than the internal diameter of the socket 107, which stresses the socket 107, but does not exceed the elastic limits of the material. Accordingly, the socket 107 does not plastically deform, but rather maintains a near constant and consistent pressure on the ball end 104.

The pressure of the socket 107 on the ball end 104 may be adjustable by locating one of the fastening holes 105 near the socket 107. In this way, the pressure between the socket 107 and ball end 104 may be adjusted by tightening or loosening the fastener. For example, the embodiment of the tool handle 10 shown in FIGS. 20A-20D includes a fastening hole 105 very close to the socket 107, which may allow for precise tuning of the resistance of the ball end 104 within the socket 107.

As further shown in FIG. 19A, the bottom end of the hand grip 16 has a concave tip 109, which further improves the ability of the tool handle 10 (and any associated tool 8) to be hung or otherwise suspended by the hand grip 16.

Figure 19B:
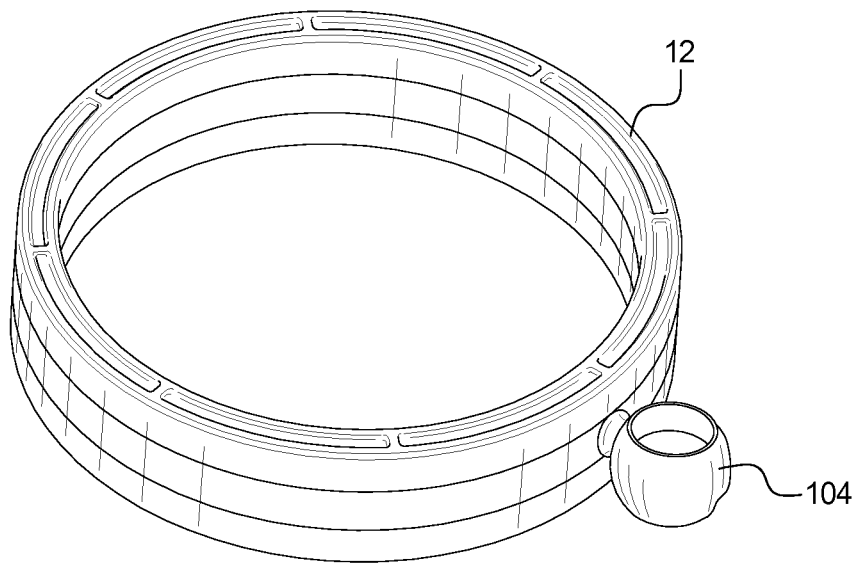

FIG. 19B is a perspective view of the arm ring 12 including the ball end 104. As shown, the ball end 104 is generally ball shaped, allowing the arm ring 12 to be infinitely adjusted with respect to the tool handle 10 within a given range of rotation. As shown in FIG. 18, the ball end 104 is secured in the socket 107 formed inside the free end 18 of the tool handle 10 at the point of attachment 20.

As shown in FIGS. 18 and 19A, a number of fastening holes 105 are located along the length of the tool handle 10 so that the tool handle 10 may be attached securely to the tool 8 and to securely mate with the ball end 104 of the arm ring 12. Various fastening techniques may be used such as screws, threaded fasteners, or other mechanisms known in the art. Threaded fasteners like those used in FIG. 4 may be used. However, it is contemplated that any other mechanism may be used to join the two halves 102 of the tool handle 10.

In the example shown in FIGS. 18-19, the tool handle 10 is configured to be used with a tool 8 having a circular shaft 49, such as a conventional broomstick. However, it is contemplated that in other embodiments the tool handle 10 may be adapted to mate with other tools of various shapes. For example, the tool handle 10 may be adapted to mate with the handle of a chainsaw or other power tool.

As further illustrated in FIGS. 20A-D, the arm ring 12 is rotatable with respect to the tool handle 10. While infinitely adjustable within the range of rotation, there are four distinct positions identified in FIGS. 20A-D.

Figure 20A:
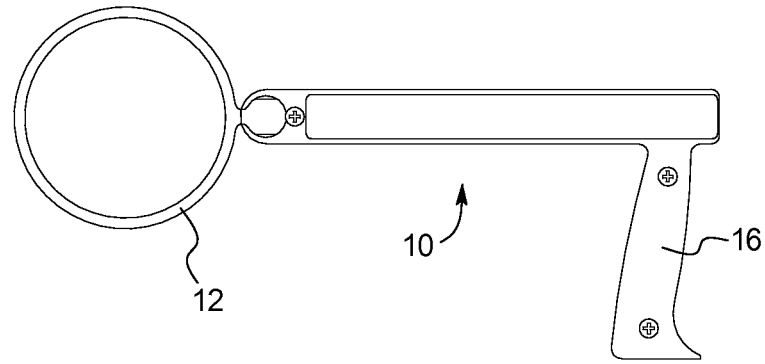
FIGS. 20 A-D are side views of four different positions of the alternative embodiment of the tool handle member of FIG. 18.

In a first position shown in FIG. 20A, the arm ring 12 is shown extending outward away from the free end 18 of the tool handle 10. The arm ring 12 is oriented generally parallel to the hand grip 16, allowing the tool handle 10 (or a series of tool handles 10) to be easily hung on a hook. For example, several tool handles 10 may be compactly stacked and hung on a hook by their arm rings 12, since the tool handle 10 is as compact as practical in the position shown in FIG. 20A. Enabling the arm ring 12 to be rotated into this position provides a great benefit for retailers or owners of several tool handles 10.

Figure 20B:
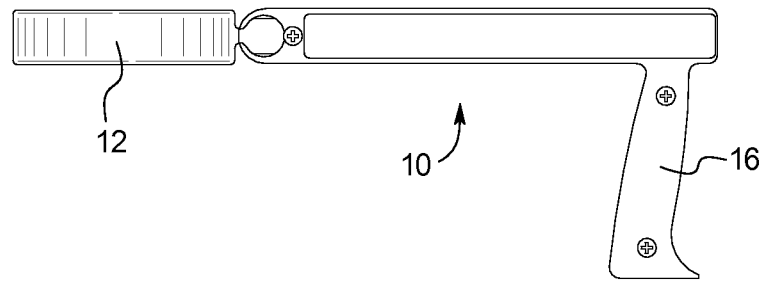

In a second position shown in FIG. 20B, the arm ring 12 is rotated 90-degrees around a first axis (running horizontally through the length of the tool handle 10) from the position shown in FIG. 20A. This second position is shown as a transition between the first position shown in FIG. 20A and the third position shown in FIG. 20C.

Figure 20C:
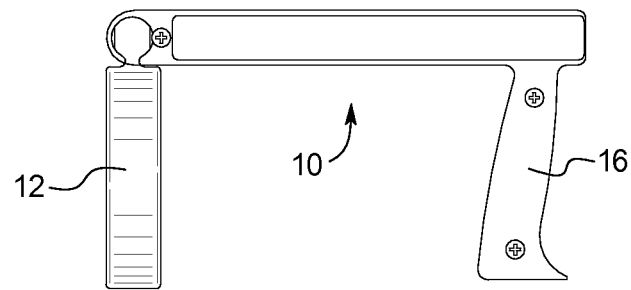

In a third position shown in FIG. 20C, the arm ring 12 is rotated 90-degrees around a second axis (running in to and out of the page). This position has multiple functions. In the main function, this position allows a user to reach their arm through the arm ring 12 and grasp the hand grip 16, thus allowing the user to utilize the tool 8 connected to the tool handle 10. In another function, the tool handle 10 may be set down so that the arm ring 12 rests on the floor or any other flat surface, allowing the tool 8 being used with the tool handle 10 to sit upward, similar to the embodiment shown in FIG. 1. This function may be beneficial to set the tool 8 down in between uses, or when placing the tool 8 in storage. Instead of having to lean a tool 8 up against a wall or any other stationary object, the tool 8 may be self-supporting while attached to the tool handle 10. To this end, the slot 106 may enable greater than 90-degree rotation (for example, 110 degrees) to allow the arm ring 12 to be put in an even better position for stably standing the tool 8 on end.

Figure 20D:
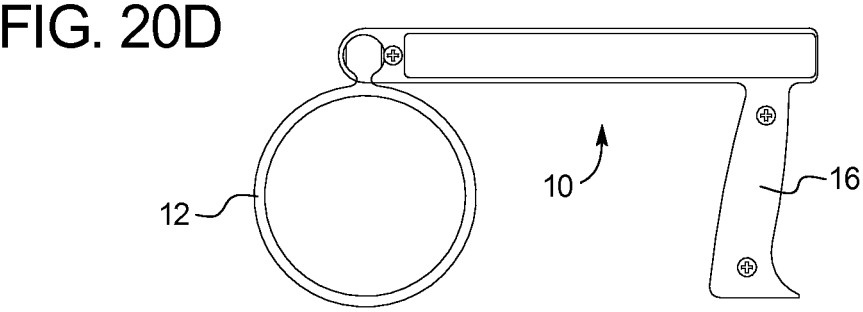

In a fourth position shown in FIG. 20D, the arm ring 12 is rotated 90-degrees around a vertical axis. Similar to the first position shown in FIG. 20A, this position may be ideal for stacking or hanging several tool handles 10 on a hook, since the arm ring 12 is parallel to the hand grip 16, making the tool handle 10 flat and more compact.

While several varied embodiments of the tool handle 10 have been illustrated and described in detail, it is understood that the tool handle 10 may take numerous forms to accomplish the objects and advantages of the present subject matter. For example, portions of the tool handle 10 may be over-molded near the end of the tool 8 with which it is associated. In such an embodiment, the arm ring 12 and/or hand grip 16 may be attached to the tool 8 and tool handle 10 by fasteners of any suitable type, including nuts, bolts, and lock washers. In other examples, the entire tool handle 10, including the arm ring 12 and hand grip 16, may be overmolded near the end of the tool 8 with which it is associated. Such an embodiment may only have a single position for the arm ring 12, but the decrease in production costs may be preferable to the increase in functionality in certain scenarios.

Figure 21:
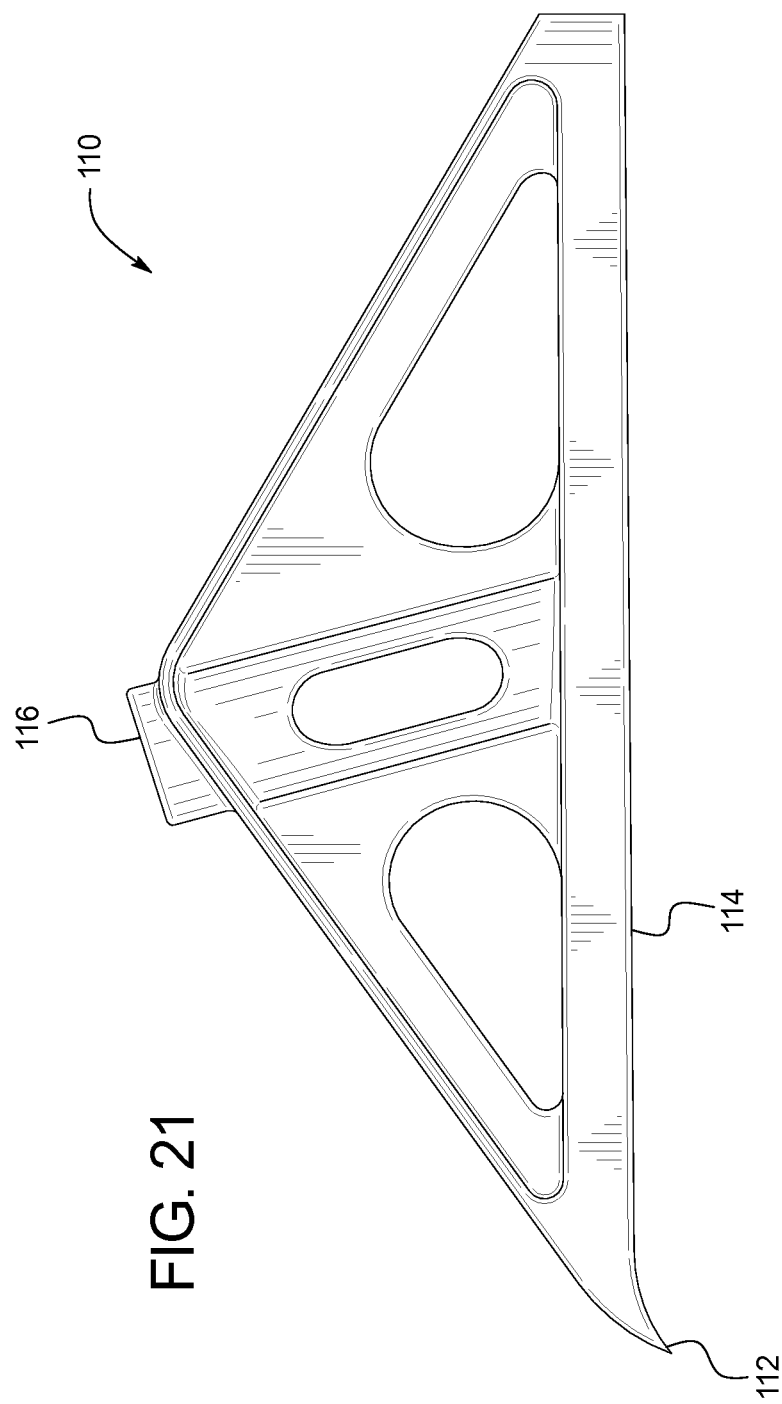
FIG. 21 is a front view of a broom head that may be used with the tool handle member.

FIG. 21 illustrates an example of a broom head 110 that may be used with the tool handle 10. The broom head 110 includes a scraper 112 located at one end of the broom head edge 114. The broom head 110 shown in FIG. 21 may be enhanced with a broom handle and broom bristles so that the broom handle fits into the broom handle opening 116 and the bristles extend outward from the broom head edge 114. The scraper 112 may add to the utility of a conventional broom, and may allow a user to more effectively clean a surface. The scraper 112 may allow a user to remove waste that the bristles may not be rigid enough to move. In other embodiments, the broom head 110 may be designed to fit over a conventional broom, thus using the existing broom handle and bristles, but adding the value of the scraper 112.

Once again, the tool handle 10 may be used with virtually any hand tool or other hand held object, including, but not limited to hand tools such as a broom, dustpan, mop, rake, shovel, plunger, etc. The tool handle 10 may also be used with electrical tools such as a vacuum, reciprocating saw, hammer drill, worm gear saw, etc. The tool handle 10 is not only compatible with tools, but may also be attached to sports equipment such as a golf clubs, putters, tennis rackets, pool cues, etc. There is virtually no hand tool whose operation may not be enhanced by using the tool handle 10.

It should be noted that various changes and modifications to the presently preferred embodiments described herein will be apparent to those skilled in the art. Such changes and modifications may be made without departing from the spirit and scope of the present invention and without diminishing its attendant advantages.

I claim:

1. A tool handle comprising:
    a body configured to receive a handle of a tool;
    a hand grip extending approximately perpendicular from the body; and
    an arm ring rotatably connected to the body via a ball joint, wherein the arm ring is adapted to be placed in at least two positions, a first position in which the arm ring is generally perpendicular to the hand grip such that a user may place the user's forearm through the arm ring to grasp the hand grip and a second position in which the arm ring is generally parallel to the hand grip so as to minimize the width of the tool handle.

2. The tool handle of claim 1 wherein the arm ring is rotatable with a resistance between the first position and second position and is temporarily fixable in at least selected positions.

3. The tool handle of claim 2 wherein the rotational resistance is sufficient for supporting independent standing of the tool handle when inverted and placed on a substrate, with the arm ring contacting the substrate.

4. The tool handle of claim 1 wherein the hand grip is located less than a cubit from the arm ring.

5. The tool handle of claim 1 wherein the body is a two-piece clamshell formation.

6. The tool handle of claim 1 wherein the body is overmolded on the handle of the tool.

7. The tool handle of claim 1 wherein the ball joint is formed within a socket at a free end of the body.

8. The tool handle of claim 7 wherein the socket includes a slot guiding the movement of the arm ring within the socket.

9. The tool handle of claim 1 wherein the inner diameter of the arm ring is approximately 3 to 5 inches and the distance from the arm ring to the hand grip is approximately 6 to 10 inches.

10. A tool handle comprising:
    a tool handle member having a first crossbar with a free end and an opposite working end;
    an arm ring rotatably disposed on the free end of the crossbar at a point of attachment, wherein the point of attachment is a ball joint, including a ball end located on the arm ring and a socket on the crossbar, being rotatable with a resistance about the point of attachment and being temporarily fixable in selected positions; and
    a hand grip secured to and extending generally transversely from the crossbar.

11. The tool handle of claim 10 wherein the rotational resistance is sufficient for supporting independent standing of the tool handle when inverted and placed on a substrate, with the arm ring contacting the substrate.

12. The tool handle of claim 10 wherein the rotational resistance is formed primarily by the outer diameter of the ball end being slightly larger than the inner diameter of the socket.

13. The tool handle of claim 12 wherein the stress placed on the socket by the ball end does not exceed the elastic limits of the material forming the socket.

14. A tool handle comprising:
    a shaft having a proximate end, including a socket, and an opposite distal end, wherein at least the distal end attaches to a tool implement;
    an arm ring having a ball end for rotatably engaging as a ball joint the socket at the proximate end of the shaft, wherein the arm ring rotates with a resistance to free rotation; and
    a hand grip extending generally transversely from the shaft at less than a cubit from the arm ring and the proximate end of the shaft.

15. The tool handle of claim 14 wherein the arm ring is rotatably engaged to the tool handle with a threaded fastener system configured for providing resistance.

16. The tool handle of claim 14 wherein the shaft is a two-part clamshell formation.

17. The tool handle of claim 14 wherein the rotational resistance of the arm ring allows independent standing of an inverted tool, wherein the arm ring contacts a substrate.

* * * * *